(12) United States Patent
Curry et al.

(10) Patent No.: US 7,606,749 B2
(45) Date of Patent: Oct. 20, 2009

(54) STRUCTURED CREDIT ENHANCEMENTS

(75) Inventors: Daniel Curry, Chappaqua, NY (US);
Eben Garnett, New York, NY (US)

(73) Assignee: Morgan Stanley, New York, NY (US)

( * ) Notice: Subject to any disclaimer, the term of this patent is extended or adjusted under 35 U.S.C. 154(b) by 877 days.

(21) Appl. No.: 10/811,318

(22) Filed: Mar. 26, 2004

(65) Prior Publication Data

US 2004/0249736 A1    Dec. 9, 2004

(51) Int. Cl.
    *G06Q 40/00* (2006.01)
(52) U.S. Cl. .............................. 705/35; 705/38; 705/37; 705/36 R; 705/36 T
(58) Field of Classification Search .................. 705/4, 705/35, 36 R, 38, 37, 1, 39, 36 T
    See application file for complete search history.

(56) References Cited

U.S. PATENT DOCUMENTS

| | | | | |
|---|---|---|---|---|
| 4,648,038 | A * | 3/1987 | Roberts et al. | 705/36 R |
| 6,263,321 | B1 * | 7/2001 | Daughtery, III | 705/36 R |
| 6,654,727 | B2 * | 11/2003 | Tilton | 705/36 R |
| 2002/0038285 | A1 * | 3/2002 | Golden et al. | 705/38 |
| 2002/0169708 | A1 * | 11/2002 | Chittenden | 705/37 |
| 2003/0050884 | A1 * | 3/2003 | Barnett | 705/35 |

FOREIGN PATENT DOCUMENTS

| | | | |
|---|---|---|---|
| EP | 182450 A | * | 5/1986 |
| JP | 2001209679 A | * | 8/2001 |

OTHER PUBLICATIONS

Steiss, Alan Walter "New Financing Instruments for State and Local Capital Facilities" Fall 1998, Public Budgeting and Finance V18N3pp. 24-41.*
Hildreth, W Bartley "State and Local Governments as Borrowers-Strategic Choices and the Capital Market" Jan./Feb. 1993 Public Administration Review V53N1 pp. 41-49.*
Moore, "Bond Insurance as a Form of Credit Enhancement in California's Municipal Bond Market," Jun. 2003.
Neal, "Credit Derivatives: New Financial Instruments for Controlling Credit Risk", *Economic Review*, 1996.

(Continued)

*Primary Examiner*—Kelly Campen (57) ABSTRACT

Methods of raising funds for an entity, such as a municipality. The method may include the entity offering a first set of debt obligations and offering a second set of debt obligations by one of the entity and a second entity created for the purpose of offering the second set of debt obligations. The method additionally includes purchasing assets with proceeds from the offering of the second set of debt obligations. Holders of the first set of debt obligations have a security interest in the assets such that, in the event the entity defaults on a payment obligation of the first set of debt obligations, the assets are liquidated to redeem the first set of debt obligations from the holders thereof. Alternatively, proceeds from the assets may be paid as due to the holders of the first set of debt obligations.

24 Claims, 4 Drawing Sheets

OTHER PUBLICATIONS

"Fedwire Funds Transfer System, Assessment of Compliance with the Core Principles for Systemically Important Payment Systems," Revised Mar. 2009, accessed at http://www.federalreserve.gov/paymentsystems/coreprinciples/default.htm on May 26, 2009.

Federal Reserve Financial Services, "Federal Reserve Banks Operating Circular No. 5, Electronic Access," Effective Mar. 15, 2006, accessed at www.frbservices.org/files/regulations/pdf/operating_circular_5.pdf on May 26, 2009.

* cited by examiner

STRUCTURED CREDIT ENHANCEMENTS

BACKGROUND

The present invention is related generally to financing and, more particularly, to financing through the issuance of debt obligations.

Municipalities may issue debt instruments that are tax-exempt if the proceeds of the offering are to be used by the municipality to fund projects related to their day-to-day activities or for specific projects that they might be undertaking (usually pertaining to the development of local infrastructure such as roads, sewerage, hospitals, etc.). Debt instruments may be issued as fixed or variable rate. One type of variable rate tax-exempt debt obligation that municipalities sometimes issue is tax-exempt variable rate demand obligations (VRDOs). VRDOs are bonds (VRDBs) or notes (VRDNs) which bear interest at a variable, or floating, rate established at specified intervals, e.g., daily, weekly or annually. VRDOs contain a put option permitting the holder to tender the bond or note for purchase when a new interest rate is established.

Since borrowing costs are, in part, a function of the credit quality of the borrower, municipalities typically seek to secure the highest rating for their issued debt instruments. Moreover, when issuing VRDOs, municipalities typically seek to issue VDROs that are attractive to money market funds. Money market funds are subject to rule 2(a)(7) under the Investment Company Act of 1940. In order for a municipality's bonds, including VRDBs, to satisfy rule 2(a)(7) such that they may be held by a money market fund, the issuer of the bonds must have a very high long-term credit rating. Issuers who do not have a very high long-term credit rating on their own could traditionally enhance their credit rating by either (i) obtaining bond insurance or some other guaranty or (ii) obtaining a letter of credit.

Many tax-exempt issuers are finding it increasingly difficult to find traditional credit enhancement. Due to rating agency concerns and self-imposed single name risk exposure limits, many traditional enhancers are not able to provide additional enhancements to these issuers on a cost effective basis.

Obtaining a letter of credit (LOC) is also problematic for many issuers. Several traditional LOC providers have exited the market due to profitability concerns or due to rating downgrades below the required rating category. LOCs also expose the issuer to put risk in the event the LOCs ratings decline or if the facility is not renewed. Because a typical LOC has a term of 1-3 years, the rollover/put risk makes it difficult to create core variable rate funding.

Consequently, there exists a need for alternative mechanisms by which a prospective issuer of municipal bonds can enhance the credit rating of its issues.

SUMMARY

In one general aspect, embodiments of the present invention are directed to a transaction structure for raising funds for an entity, such as a municipality. According to various embodiments, the transaction structure includes the offering by the entity of a first set of debt obligations. The first set of debt obligations may be, for example, tax-exempt municipal bonds, such as tax-exempt VRDOs. The transaction structure further includes offering a second set of debt obligations by either the entity or a second entity created for the purpose of offering the second set of debt obligations. The second set of debt obligations may be, for example, taxable floating rate notes. In addition, according to embodiments of the transaction structure, highly-rated assets are purchased with the proceeds from the offering of the second set of debt obligations. The assets may act as collateral for the first set of debt obligations, up to, for example, the par value of the first set of debt obligations plus accrued interest. Therefore, the holders of the first set of debt obligation may have a security interest in the assets such that, in the event the entity/issuer defaults, the assets may be liquidated to redeem the first set of debt obligations from the holders thereof at par value plus accrued interest. Alternatively, proceeds from the assets may be paid as due to the holders of the first set of debt obligations.

The credit rating for the first set of debt securities may correspond to the credit rating of the assets used as collateral. Assets having a high credit rating, such as AA or AAA, may be selected as the collateral. In this way, for instance, a municipality that does not have a sufficiently high credit rating to issue municipal bonds that can be held by a rule 2(a)(7) money market fund or cannot obtain adequate credit enhancement to satisfy rule 2(a)(7) can issue tax-exempt municipal bonds, collateralized by sufficiently highly-rated assets (e.g., AA or AAA), that can be held by rule 2(a)(7) money market finds.

The holders of the second of debt obligations may receive (i) interest earnings on the assets, so long as the assets have not been liquidated to redeem the first set of debt obligations, and (ii) an additional payment, reflecting a credit spread, from the entity. In the event the entity/issuer defaults, the assets may be liquidated to redeem the first set of debt obligations, as mentioned above, and the holders of the second set may have an unsecured claim against the entity. In the event the assets default, the credit rating of the first set of debt obligations may be downgraded to the credit rating of the entity/issuer. In order to protect the holders of the second set of debt obligations from default by the entity on the credit spread payments, the credit spread payments may be payable in parity with the payments for the first set of debt obligations.

DESCRIPTION OF THE FIGURES

Embodiments of the present invention will be described by way of example in conjunction with the following figures, wherein.

DESCRIPTION

Figure 1A:
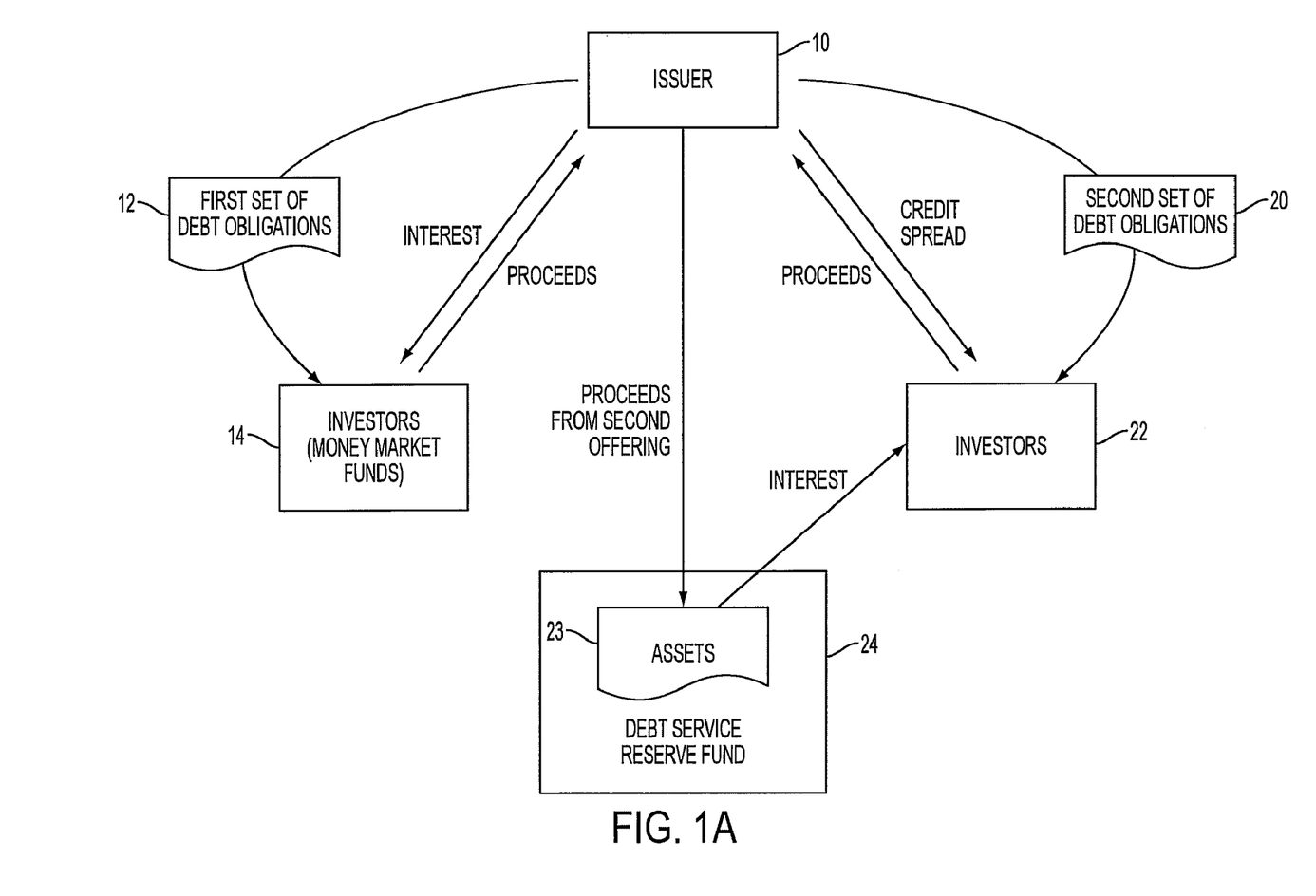
FIGS. 1A-C illustrate a transaction structure according to various embodiments of the present invention.
Figure 1B:
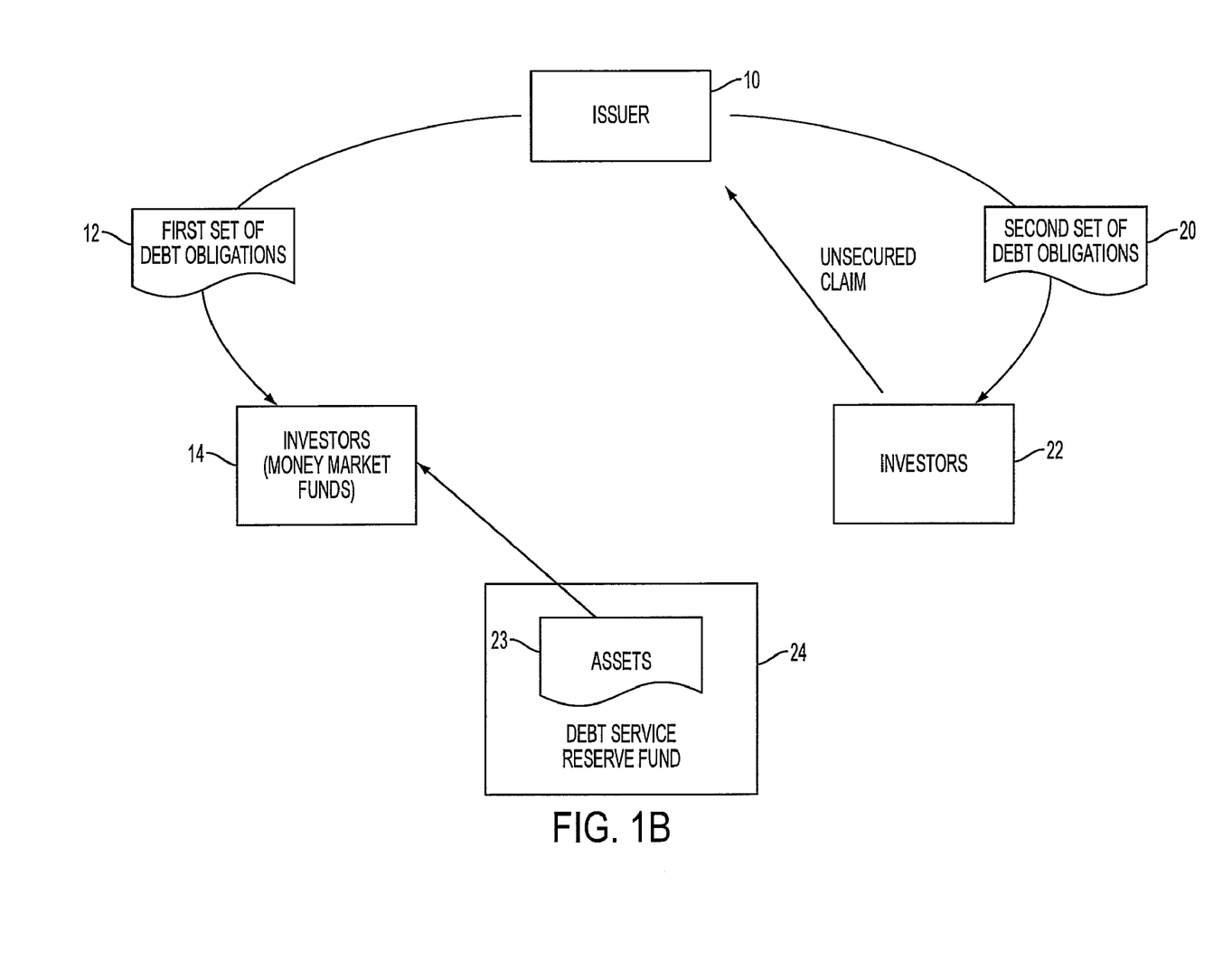
Figure 1C:
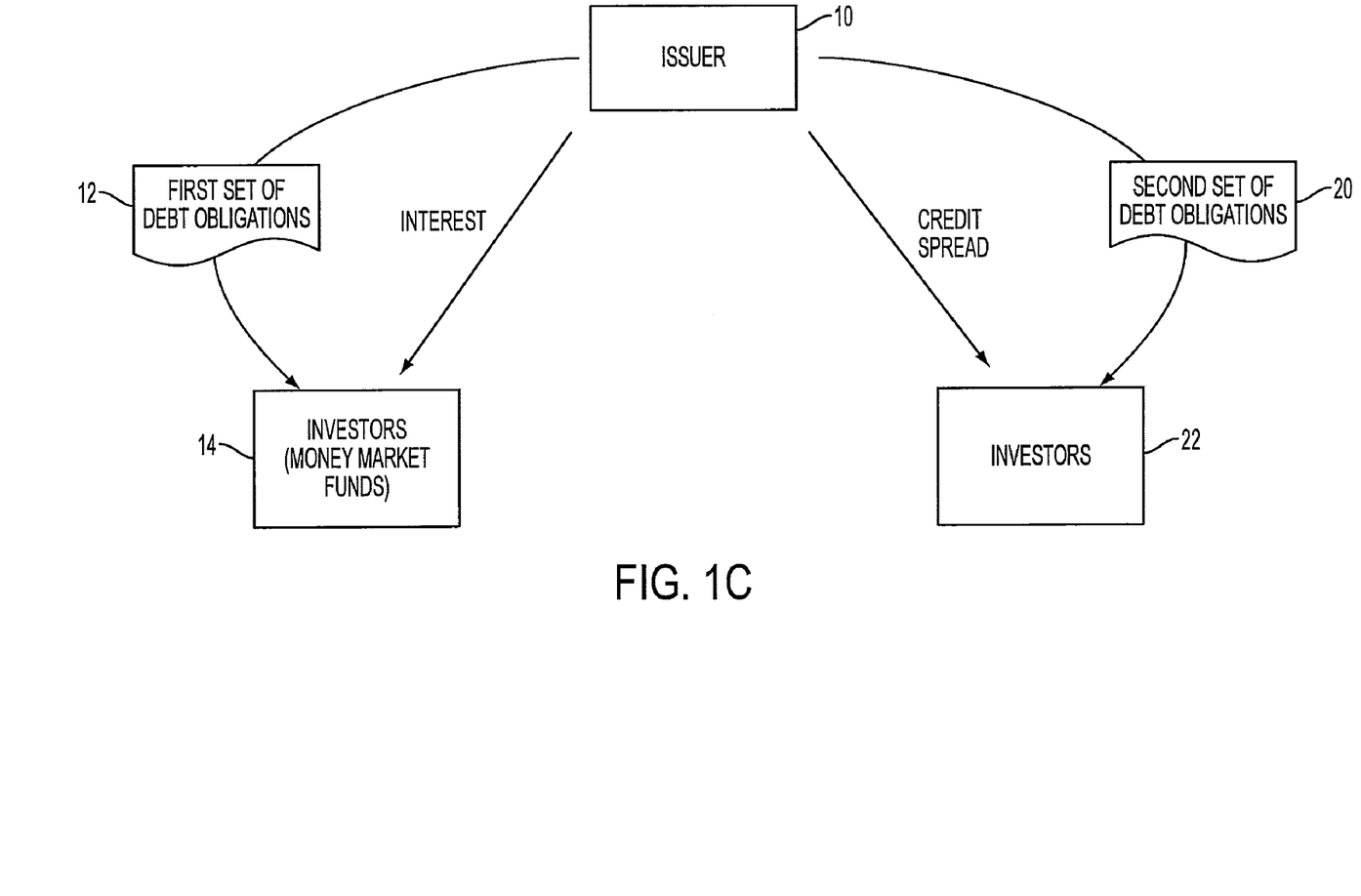

FIGS. 1A-C illustrate a transaction structure for raising funds for an entity, such as a municipality, according to various embodiments of the present invention. In the transaction structure, as shown in FIG. 1A, an issuer 10 issues a first set of debt obligations 12 to investors 14. The investors 14 pay proceeds to the issuer 10 in exchange for the debt obligations 12. The debt obligations 12 may require that the issuer 10 make periodic interest payments to the holders of the debt obligations 12 (e.g., the investor 14), such as semiannual interest payments, as well as repay the principal at maturity. Alternatively, portions of the principal may be repaid during the term of the debt obligations prior to maturity.

The issuer 10 may be, for example, a municipality or a conduit for an eligible third party seeking to raise funds in the tax-exempt market. The interest paid on the first set of debt obligations 12 may be tax-exempt. For example, the first set of debt obligations 12 may be tax exempt because the issuer 10 is a municipality that uses the proceeds from the issuance of the debt obligations 12 to fund activities in the normal course of its business.

The first set of debt obligations 12 may be variable or fixed rate debt obligations. For an embodiment where the debt obligations 12 are variable rate instruments, the debt obligations 12 may be variable rate demand obligations (VRDOs), such as bonds (i.e., VRDBs) or notes (i.e., VRDNs). The investors 14 may be, for example, tax-exempt money market finds that are subject to rule 2(a)(7) under the Investment Company Act of 1940.

For an embodiment wherein the debt obligations 12 are VRDOs, the issuer 10 may pay a variable interest rate on the VRDOs to the investors 14 as holders of the VRDOs. The variable interest rate for the VRDOs may be established at specific intervals, such as daily, weekly, monthly, etc., and may correspond to, for example, a rate set by The Bond Market Association (BMA), plus or minus a spread. The VRDOs may contain, as VRDOs typically do, a put option that allows the holder to tender the VRDOs for purchase at par value (i.e., face value) when a new interest rate is established.

In addition, as shown in FIG. 1A, the issuer 10 may issue a second set of debt obligations 20 to a group of investors 22. The second set of debt obligations 20 may be, for example, variable or fixed rate bonds, notes, trust-preferred shares, or any other type of financial instrument evidencing some form or degree of debt ownership. According to various embodiments, the second set of debt obligations 20 may be floating rate notes (FRNs) having, in that connection, a principal amount and a floating interest rate. The term for the second set of debt obligations 20 may be at least as long as the term of the first set of debt obligations 12, for reasons that will become apparent below.

In exchange for the second set of debt obligations 20, the investors 22 pay proceeds to the issuer 10. With the proceeds from the offering of the second set of debt obligations 20, the issuer 10 may purchase highly rated, in a credit sense, assets 23. Those assets 23 may be placed in a debt service reserve fund ("DSRF") 24, which may be administered by a trustee (not shown) or payable by a paying agent (not shown). The assets 23 of the DSRF 24 may act as collateral for the first set of debt obligations 12. That is, for example, in the event the issuer 10 defaults, as explained in more detail below in connection with FIG. 1B, the assets 23 of the reserve fund 24 may be liquidated by the trustee and the proceeds from the liquidation used to redeem the first set of debt obligations 12 from the holders thereof at par plus accrued interest. As such, the holders of the first set of debt obligations 12 may have a security interest in the assets 23 that is capped at the par value of the first set of debt obligations 12 plus accrued interest. Any residual assets in the DSRF may be pledged to the holders of the second set of debt obligations 20. Alternatively, proceeds from the assets may be paid as due to the holders of the first set of debt obligations 12.

The DSRF 24 may be funded, for example, with up to 100% of the proceeds of the offering of the second set of debt obligations 20. For this reason, the interest payments on the second set of debt obligations 20 may be taxable even if the issuer 10 is a municipality.

The second set of debt obligations 20 may stipulate that the holders thereof (e.g., the investors 22) are entitled to receive the interest paid on the assets 23, so long as the assets 23 have not been liquidated to redeem the first set of debt obligations 12. For this reason, the maturity date of the second set of debt obligations 20 is preferably contemporaneous with or subsequent to the maturity date of the first set of debt obligations 12. In addition, the second set of debt obligations 20 may stipulate that the holders thereof are entitled to an additional payment from the issuer 10 reflecting a credit spread. For, the second set of debt obligations 20 may promise the holders thereof a combined payment from the assets 23 and the issuer 10 of an interest index (e.g., LIBOR) plus a spread, for example 50 basis points (bps), 60 bps, etc. Thus, for example, if the interest on the assets 23, paid to the holders of second set of debt obligations 20, is below LIBOR, the issuer 10 would have to make an additional payment corresponding to the sum of (i) the difference between LIBOR and the interest rate on the assets and (ii) the credit spread.

The assets 23 may be, for example, debt instruments that pay a variable or fixed interest rate. To provide credit enhancement for the first set of debt obligations 12, the assets 23 preferably have a credit rating greater than, for example, general obligation debt instruments issued by the issuer 10. For example, the assets 23 may have a high credit rating, such as AA or AAA. The assets 23 may be discount notes issued by a Government Sponsored Enterprise (GSE), such as Fannie Mae. The term of the debt instruments comprising the assets 23 may be less than the debt service period of the first set of debt obligations 12. For example, the issuer 10 may be required to make semiannual debt service payments on the first set of debt obligations 12. In that case, the term of the debt instruments comprising the assets 23 may be, for example, one month. The issuer 10 may enter into a contract with the issuer (not shown) of the asset 23 to purchase replacement assets on each maturity date. The contract may stipulate that the issuer 10 can cancel the contract, without penalty, if, for example, the credit rating of the assets 23 is downgraded. In that case, the trustee of the DSRF 24 may be instructed to replace the assets 23 with higher rated assets. The contract may further allow the issuer 10 to cancel the contract for other reasons, such as if the assets 23 are liquidated.

FIG. 1B is a diagram of the payment flows under the transaction structure if the issuer 10 defaults according to various embodiments of the present invention. As illustrated in FIG. 1B, if, for example, the issuer 10 defaults, the assets 23 may be liquidated to redeem the first set of debt obligations 12 from the holders thereof (e.g., the investors 14) at par plus accrued interest. In that case, there would be no assets to pay the interest to holders of the second set of debt obligations 20 (e.g., the investors 22). Alternatively, proceeds from the assets may be paid as due to the holders of the first set of debt obligations 12. If the issuer 10 were unable to pay its payment obligations on the first set of debt obligations 12, it would likely be unable to pay the credit spread on the second set of debt obligations 20. In that case, the holders of the second set of debt obligations 20 (e.g., the investors 22) would have an unsecured claim against the issuer 10 for the principal and accrued interest. For this reason, the rating for the first set of debt obligations 12 may correspond to the rating for the assets 23 (preferably AAA) and the rating for the second set of debt obligations 20 may correspond to the rating of other general obligation bonds of the issuer 10.

FIG. 1C is a diagram of the payment flows under the transaction structure if the assets 23 default according to various embodiments of the present invention. In this circumstance, the credit rating on the first set of debt obligations 12 would be downgraded to the credit rating of the issuer 10. The DSRF 24 would be liquidated and the proceeds divided pro-rata among the holders of the first set of debt obligations 12. The obligation of the issuer 10 to make the interest payments to the holders of the first set of debt obligations 12 would remain for the term of the first set of debt obligations 12.

Further, the obligation of the issuer 10 to make the credit spread payments to the holders of the second set of debt obligations 20 may or may not remain, although the holders of the second set of debt obligations 20 would no longer receive the interest payments on the assets 23 as the assets 23 are in default.

According to the above-described transaction structure, for instance, an issuer 10, such as a municipality that (i) does not have a sufficiently high credit rating to issue bonds that can be held by a money market fund subject to rule 2(a)(7) and (ii) cannot obtain adequate bond insurance or a LOC to satisfy rule 2(a)(7) can issue tax-exempt municipal bonds that are collateralized by sufficiently highly-rated assets (e.g., AA or AAA), such that the municipal bonds are eligible to be held by rule 2(a)(7) money market funds. As an example, suppose a municipality (e.g., the issuer 10) wishes to raise $1 B to be used to fund its day-to-day operations or some other bona fide municipality-related project. In that case, the municipality may issue $1 B worth of tax-exempt municipal bonds (e.g., VRDOs) as the first set of debt obligations 12, as well as $1 B worth of the taxable floating rate notes for the second set of debt obligations 20. The $1 B raised from the offering of the tax-exempt municipal bonds may fund the municipality's operations or projects. The $1 B from the offering of the taxable debt obligations 20 may be used to purchase the highly rated assets 23.

At issuance, the taxable debt obligations 20 need not be considered an obligation of the municipality as the holders of the taxable debt obligations 20 are paid from interest earnings of the assets 23. The credit spread, however, may be considered a general obligation of the municipality and, as such, the municipality could not default on the credit spread payment without causing a default on other general obligation bonds.

The total liability of the municipality under the transaction structure would only be $1 B despite the fact that it issued a total of $2 B worth of debt. The municipality would either owe the holders of the tax-exempt municipal bonds $1 B at the maturity date of the tax-exempt bonds if the municipality did not default, or the holders of the taxable floating rate notes would have an unsecured claim for $1 B against the municipality if the municipality did default.

According to other embodiments, the second set of debt obligations 20 may be issued by a second entity, such as a special purpose vehicle or a trust, created for the purpose of issuing the second set of debt obligations 20. In such embodiments, the issuer 10 may pay the credit spread payment to the second entity and the second entity may pay the credit spread payment to the holders of the second set of debt obligations 20. Also, the size of the offering of the second set of debt obligations 20 may be equal to or greater than the size of the offering of the first set of debt obligations 12. It may be necessary to make the size of the second set of debt obligations 20 greater than the first set 12 to provide for accrued interest on the first set 12.

Figure 2:
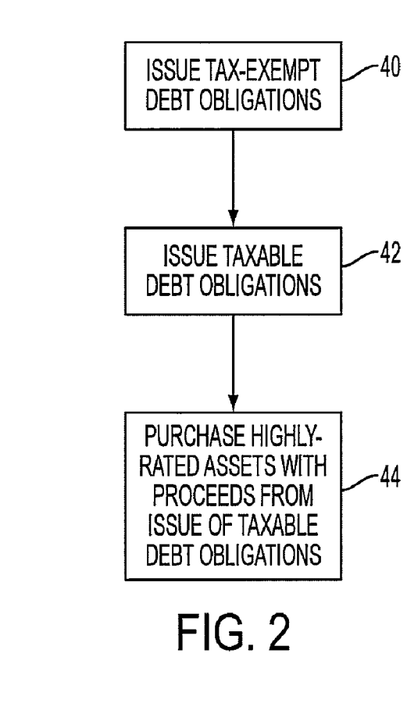
FIG. 2 is a flowchart for a process according to various embodiments of the present invention.

FIG. 2 is a flowchart of a process for implementing the transaction structure according to various embodiments of the present invention. The process starts at step 40 where the issuer 10 issues the tax-exempt debt obligations 12. At step 42, the issuer 10 issues the taxable debt obligations 20. At step 44, the issuer 10 purchases the highly rated assets 23 with the proceeds from the offering of the taxable debt obligations 20 at step 42. The assets 23 may act as collateral for the tax-exempt debt obligations 12 issued at step 40, as described before. The steps of FIG. 2 may be performed in various orders.

The offerings of the first and second sets of debt obligations 12, 20 may be underwritten by one or more underwriters (not shown). In various embodiments, one underwriter may underwrite both offerings. Alternatively, one underwriter may underwrite the offering of the tax-exempt debt obligations 12 and a second underwriter may underwrite the offering of the taxable debt obligations 20.

Figure 3:
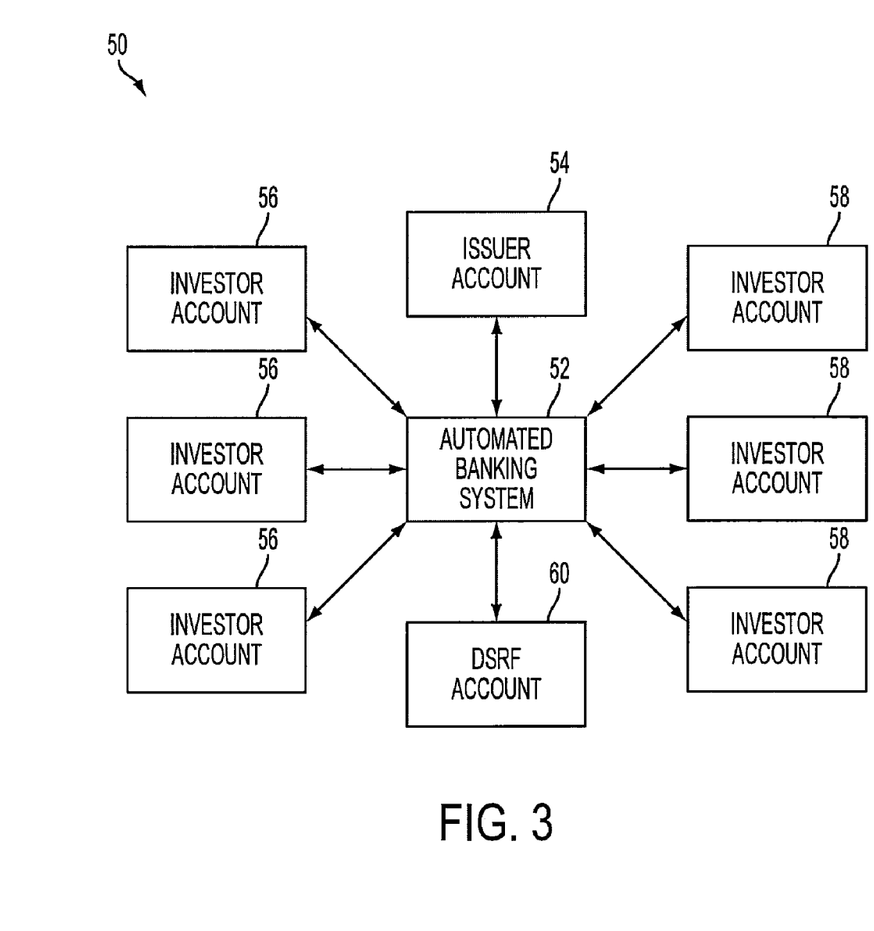
FIG. 3 is a diagram of a system according to various embodiments of the present invention.

FIG. 3 is a diagram of a system 50 according to various embodiments of the present invention. As illustrated in FIG. 3, the system 50 may include an automated banking system 52. The automated banking system 52 may be used, for example, to electronically transfer funds from an account 54 of the issuer 10 to accounts 56 of the investors 14, such as for payment of the interest on the tax-exempt debt obligations 12, as well as to accounts 58 of the investors 22, such as for payment of the credit spread payment. Similarly, the automated banking system 52 may transfer funds between an account 60 of the DSRF 24 to the accounts 58 of the investors 22, such as for the interest earnings on the assets 23.

While several embodiments of the invention have been described, it should be apparent, however, that various modifications, alterations and adaptations to those embodiments may occur to persons skilled in the art with the attainment of some or all of the advantages of the present invention. For example, the steps described above in connection with the various transaction structures may be performed in various orders. It is therefore intended to cover all such modifications, alterations and adaptations without departing from the scope and spirit of the present invention as defined by the appended claims.

What is claimed is:

1. A method for facilitating raising funds for an entity, comprising:

electronically transferring funds, by an electronic automated banking system, to holders of a first set of debt obligations issued by the entity, wherein the funds are electronically transferred from an account of the entity to accounts of the holders of the first set of debt obligations;

electronically transferring funds, by the electronic automated banking system, to holders of a second set of debt obligations, wherein the second set of debt obligations are issued by at least one of the entity and a second entity created for the purpose of issuing the second set of debt obligations, and wherein the funds are electronically transferred from an account of the at least one of the entity and a second entity to accounts of the holders of the second set of debt obligations; and purchasing assets with proceeds from the issuance of the second set of debt obligations, wherein holders of the first set of debt obligations have a security interest in the assets such that, in the event the entity defaults, the assets are liquidated to redeem the first set of debt obligations from the holders thereof.

2. The method of claim 1, wherein the second set of debt obligations entitles the holders thereof to:

receive interest earnings on the assets, so long as the assets have not been liquidated to redeem the first set of debt obligations; and receive an additional payment from one of the entity and the second entity.

3. The method of claim 2, wherein the security interest of the holders of the first set of debt obligations is capped at the par value of the first set of debt obligations plus accrued interest.

4. The method of claim 3, wherein:

the first set of debt obligations is tax-exempt; and the second set of debt obligations is taxable.

5. The method of claim 4, wherein the assets have a credit rating greater than the credit rating of general obligation bonds issued by the entity.

6. The method of claim 4, wherein the first set of debt obligations includes variable rate demand obligations.

7. The method of claim 6, wherein the variable rate demand obligations include variable rate demand bonds.

8. The method of claim 6, wherein the second set of debt obligations includes floating rate notes.

9. The method of claim 8, wherein the assets include discount notes from a government sponsored enterprise.

10. The method of claim 9, wherein the assets have a credit rating greater than the credit rating of general obligation bonds issued by the entity.

11. The method of claim 4, wherein the first set of debt obligations include fixed rate demand obligations.

12. The method of claim 4, wherein the entity is a municipality.

13. The method of claim 2, wherein the maturity date of the second set of debt obligations is after the maturity date of the first set of debt obligations.

14. The method of claim 1, wherein the sizes of the offerings of the first and second debt obligations are the same.

15. A method for facilitating raising funds for an entity, comprising:

electronically transferring funds, by an electronic automated banking system, to holders of tax-exempt variable rate demand obligations issued by the entity, wherein the funds are electronically transferred from an account of the entity to accounts of holders of the tax-exempt variable rate demand obligations;

electronically transferring funds, by the electronic automated banking system, to holders of taxable floating rate notes issued by the entity, wherein the funds are electronically transferred from an account of the entity to accounts of the holders of the taxable floating rate notes;

purchasing assets with proceeds from the issuance of the taxable floating rate notes, wherein holders of the variable rate demand obligations have a security interest in the assets such that, in the event the entity defaults, the assets are liquidated to redeem the variable rate demand obligations from the holders thereof.

16. The method of claim 15, wherein the taxable floating rate notes entitle the holders thereof to:

receive interest earnings on the assets, so long as the assets have not been liquidated to redeem the variable rate demand obligations; and receive an additional payment from the entity.

17. The method of claim 16, wherein the security interest of the holders of the variable rate demand obligations is capped at the par value of the variable rate demand obligations plus accrued interest.

18. The method of claim 17, wherein the assets have a credit rating of one of AA and AAA.

19. The method of claim 18, wherein the assets include discount notes from a government sponsored enterprise.

20. The method of claim 19, wherein the entity is a municipality.

21. The method of claim 20, wherein the maturity date of the second set of debt obligations is after the maturity date of the first set of debt obligations.

22. A method for facilitating raising funds for an entity, comprising:

electronically transferring funds by an electronic automated banking system, to holders of a first set of debt obligations issued by the entity, wherein the funds are electronically transferred from an account of the entity to accounts of the holders of the first set of debt obligations;

electronically transferring funds by the electronic automated banking system, to holders of a second set of debt obligations, wherein the second set of debt obligations are issued by at least one of the entity and a second entity created for the purpose of issuing the second set of debt obligations, and wherein the funds are electronically transferred from an account of the at least one of the entity and a second entity to accounts of the holders of the second set of debt obligations; and purchasing assets with proceeds from the issuance of the second set of debt obligations, wherein holders of the first set of debt obligations have a security interest in the assets such that, in the event the entity defaults, proceeds from the assets are paid as due to the holders of the first set of debt obligations.

23. The method of claim 22, wherein the second set of debt obligations entitles the holders thereof to:

receive interest earnings on the assets, so long as the assets have not been liquidated to redeem the first set of debt obligations; and receive an additional payment from one of the entity and the second entity.

24. The method of claim 23, wherein:

the first set of debt obligations is tax-exempt; and the second set of debt obligations is taxable.

* * * * *

UNITED STATES PATENT AND TRADEMARK OFFICE
CERTIFICATE OF CORRECTION

PATENT NO. : 7,606,749 B2 Page 1 of 1
APPLICATION NO. : 10/811318
DATED : October 20, 2009
INVENTOR(S) : Curry et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1315 days.

Signed and Sealed this

Twelfth Day of October, 2010

David J. Kappos
*Director of the United States Patent and Trademark Office*